United States Patent
Fisher et al.

(10) Patent No.: US 9,700,955 B2
(45) Date of Patent: Jul. 11, 2017

(54) SYSTEMS AND METHODS FOR USING FLUORINE-CONTAINING GAS FOR SUBMERGED ARC WELDING

(71) Applicant: Illinois Tool Works Inc., Glenview, IL (US)

(72) Inventors: Kenneth Allen Fisher, Neenah, WI (US); Mario Anthony Amata, Dublin, OH (US); Steven Edward Barhorst, Sidney, OH (US); Joseph C. Bundy, Piqua, OH (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 658 days.

(21) Appl. No.: 13/943,505

(22) Filed: Jul. 16, 2013

(65) Prior Publication Data

US 2013/0299462 A1    Nov. 14, 2013

Related U.S. Application Data

(63) Continuation of application No. 13/431,863, filed on Mar. 27, 2012, which is a continuation-in-part of application No. 13/079,521, filed on Apr. 4, 2011.

(51) Int. Cl.
*B23K 9/18* (2006.01)
*B23K 9/10* (2006.01)
(Continued)

(52) U.S. Cl.
CPC .............. *B23K 9/18* (2013.01); *B23K 9/1043* (2013.01); *B23K 9/164* (2013.01); *B23K 9/186* (2013.01);
(Continued)

(58) Field of Classification Search
CPC ....... B23K 9/18; B23K 9/186; B23K 35/0261
(Continued)

(56) References Cited

U.S. PATENT DOCUMENTS

| 589,934 A | 9/1897 | Clarke |
|---|---|---|
| 2,805,323 A | 9/1957 | Cushman |

(Continued)

FOREIGN PATENT DOCUMENTS

| CN | 1069437 | 3/1993 |
|---|---|---|
| CN | 2623398 | 7/2004 |

(Continued)

OTHER PUBLICATIONS

Olsen, F. O.; "Hybrid Laser—Arc Welding," Woodhead Publishing Series in Welding and Other Joining Technologies, Elsevier, 2009, p. 62.

(Continued)

*Primary Examiner* — Dana Ross
*Assistant Examiner* — Ayub Maye
(74) *Attorney, Agent, or Firm* — Fletcher Yoder P.C.

(57) ABSTRACT

This disclosure relates generally to welding, and more specifically, to submerged arc welding (SAW). In an embodiment, a welding system includes a gas supply system configured to provide a fluorine-containing gas flow. The system also includes a wire supply system configured to provide welding wire, and a flux supply system configured to provide flux near a welding arc during submerged arc welding (SAW). The system further includes a welding torch assembly configured to receive the fluorine-containing gas flow and the welding wire and to deliver the fluorine-containing gas flow and the welding wire near the welding arc during the SAW.

14 Claims, 5 Drawing Sheets

(51) Int. Cl.
  *B23K 9/16*  (2006.01)
  *B23K 9/23*  (2006.01)
  *B23K 35/38*  (2006.01)
  *B23K 35/36*  (2006.01)
  *B23K 35/362*  (2006.01)
  *B23K 35/02*  (2006.01)
  *B23K 9/29*  (2006.01)
  *B23K 103/04*  (2006.01)

(52) U.S. Cl.
  CPC ............... *B23K 9/23* (2013.01); *B23K 9/295* (2013.01); *B23K 35/0261* (2013.01); *B23K 35/362* (2013.01); *B23K 35/3605* (2013.01); *B23K 35/38* (2013.01); *B23K 2203/04* (2013.01)

(58) Field of Classification Search
  USPC ...................................... 219/72, 73, 74, 73.2
  See application file for complete search history.

(56) References Cited

U.S. PATENT DOCUMENTS

| | | | |
|---|---|---|---|
| 2,864,934 A | | 12/1958 | Bernard |
| 2,948,803 A | * | 8/1960 | Wilson et al. .................. 219/74 |
| 2,965,524 A | | 12/1960 | Claussen |
| 3,052,792 A | * | 9/1962 | Jensen et al. .................. 219/74 |
| 3,071,852 A | | 1/1963 | Rogers |
| 3,283,121 A | | 11/1966 | Bernard |
| 3,329,798 A | | 7/1967 | Johnson |
| 3,626,138 A | * | 12/1971 | Hurley .................. 219/73.21 |
| 3,692,971 A | | 9/1972 | Kniepkamp |
| 3,746,500 A | | 7/1973 | Hughey |
| 3,752,951 A | | 8/1973 | Kniepkamp |
| 3,805,016 A | | 4/1974 | Soejima |
| 3,935,421 A | | 1/1976 | Ballass |
| 3,939,323 A | | 2/1976 | Meehan |
| 3,973,712 A | | 8/1976 | Armstrong |
| 4,366,364 A | | 12/1982 | Arai et al. |
| 4,422,991 A | | 12/1983 | Phillips |
| 4,465,921 A | | 8/1984 | Sakai et al. |
| 4,482,798 A | | 11/1984 | Hurlebaus et al. |
| 4,566,916 A | | 1/1986 | Nagano et al. |
| 4,723,060 A | | 2/1988 | Arnoldy |
| 4,764,224 A | | 8/1988 | Okuda |
| 4,825,038 A | | 4/1989 | Smartt et al. |
| 5,030,817 A | | 7/1991 | Varenchuk |
| 5,055,655 A | | 10/1991 | Chai et al. |
| 5,118,119 A | | 6/1992 | Ditlinger |
| 5,192,851 A | | 3/1993 | James et al. |
| 5,225,661 A | | 7/1993 | Chai et al. |
| 5,244,144 A | | 9/1993 | Osame |
| 5,369,244 A | | 11/1994 | Kulikowski et al. |
| 5,945,014 A | | 8/1999 | Crockett |
| 6,399,912 B1 | | 6/2002 | Steenis |
| 6,476,365 B1 | | 11/2002 | Rios |
| 6,521,867 B2 | | 2/2003 | Bonnet et al. |
| 6,713,723 B2 | | 3/2004 | Lee |
| 6,723,954 B2 | | 4/2004 | Nikodym et al. |
| 6,723,957 B2 | | 4/2004 | Holverson et al. |
| 6,915,964 B2 | | 7/2005 | Tapphorn |
| 7,087,860 B2 | | 8/2006 | Nikodym et al. |
| 7,172,070 B2 | | 2/2007 | Coon et al. |
| 7,335,852 B2 | | 2/2008 | Holverson et al. |
| 7,510,664 B2 | | 3/2009 | Carr |
| 7,727,339 B2 | | 6/2010 | Kapoor et al. |
| 7,829,820 B2 | | 11/2010 | Karogal et al. |
| 8,129,652 B2 | | 3/2012 | Hampton |
| 2003/0116550 A1 | | 6/2003 | Lee |
| 2003/0186109 A1 | | 10/2003 | Huang |
| 2005/0167404 A1 | | 8/2005 | Yamazaki |
| 2006/0096966 A1 | | 5/2006 | Munz |
| 2006/0144836 A1 | | 7/2006 | Karogal et al. |
| 2006/0219684 A1 | | 10/2006 | Katiyar |
| 2006/0219685 A1 | | 10/2006 | Karogal |
| 2006/0226138 A1 | | 10/2006 | James et al. |
| 2006/0243717 A1 | | 11/2006 | Holverson et al. |
| 2006/0261053 A1 | | 11/2006 | Karogal |
| 2007/0045238 A1 | | 3/2007 | Tuttle |
| 2007/0056945 A1 | * | 3/2007 | Hammen .................. 219/137.43 |
| 2008/0090154 A1 | | 4/2008 | Ihara |
| 2008/0149513 A1 | | 6/2008 | Rolfes et al. |
| 2008/0149600 A1 | | 6/2008 | Holverson et al. |
| 2008/0199753 A1 | | 8/2008 | Fuller |
| 2008/0272100 A1 | | 11/2008 | Amata et al. |
| 2009/0278419 A1 | | 11/2009 | Teale |
| 2012/0055911 A1 | | 3/2012 | Jia |

FOREIGN PATENT DOCUMENTS

| | | |
|---|---|---|
| CN | 1528552 | 9/2004 |
| CN | 1814396 | 8/2006 |
| CN | 2818045 | 9/2006 |
| CN | 101417365 | 4/2009 |
| CN | 101422839 | 5/2009 |
| CN | 102126089 | 7/2011 |
| EP | 0278330 | 8/1988 |
| EP | 1570938 | 9/2005 |
| EP | 1764179 | 3/2007 |
| GB | 678081 | 8/1952 |
| GB | 1183463 | 3/1970 |
| GB | 1460140 | 12/1976 |
| JP | 48059041 | 8/1973 |
| JP | 57072795 | 5/1982 |
| JP | 59007495 | 1/1984 |
| JP | 61232097 | 10/1986 |
| JP | 62166098 | 7/1987 |
| JP | 5265736 | 10/1993 |
| JP | 2011088180 | 5/2011 |
| SU | 1109299 | 8/1984 |
| WO | 2007030720 | 3/2007 |
| WO | 2011127072 | 10/2011 |

OTHER PUBLICATIONS

International Search Report from PCT application No. PCT/US2013/033681 dated Jul. 18, 2013, 12 pgs.

International Search Report from PCT application No. PCT/US2013/033674 dated Jul. 18, 2013, 13 pgs.

International Search Report from PCT application No. PCT/US2011/031278 dated Jul. 1, 2011, 4 pgs.

* cited by examiner

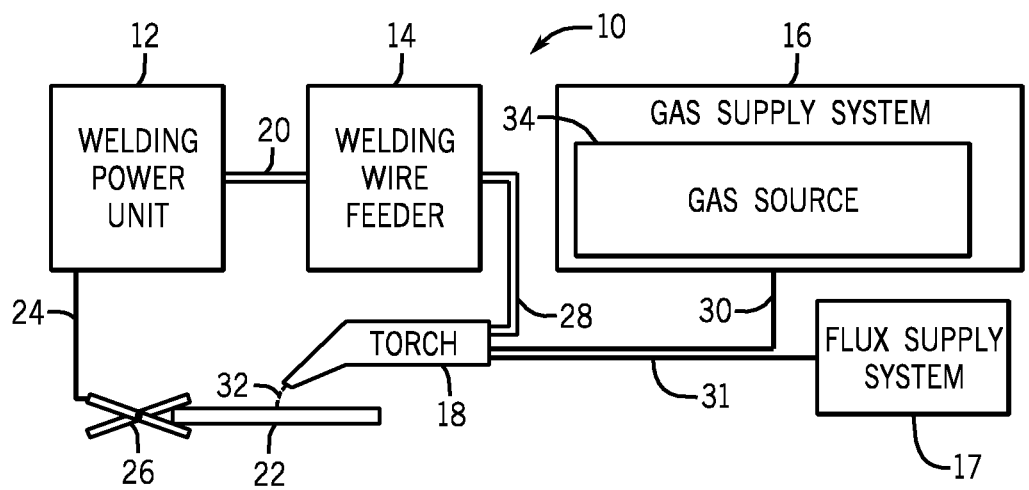
FIG. 1
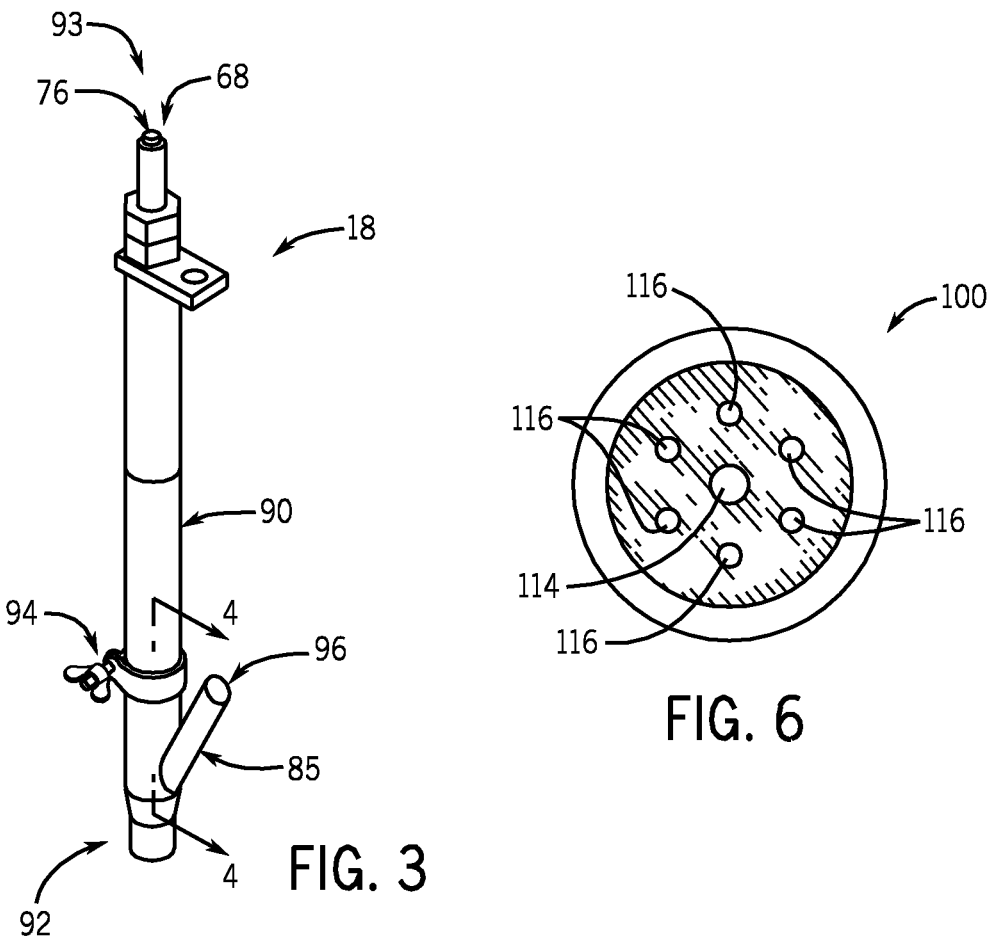
FIG. 3
FIG. 6

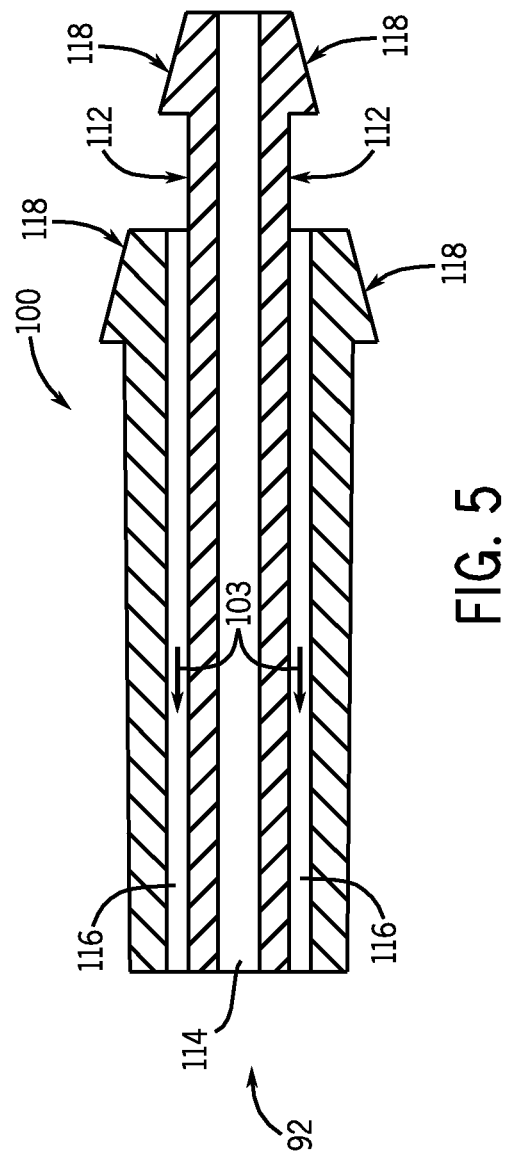

SYSTEMS AND METHODS FOR USING FLUORINE-CONTAINING GAS FOR SUBMERGED ARC WELDING

CROSS REFERENCE TO RELATED APPLICATIONS

This application is a continuation application of U.S. patent application Ser. No. 13/431,863, entitled "Systems and Methods for Using Fluorine-Containing Gas for Submerged Arc Welding", filed Mar. 27, 2012, which is a continuation-in-part application of U.S. patent application Ser. No. 13/079,521, entitled "System and Method of Reducing Diffusible Hydrogen in Weld Metal", filed Apr. 4, 2011, both of which are herein incorporated by reference in their entireties for all purposes.

BACKGROUND

This disclosure relates generally to welding, and more specifically, to submerged arc welding (SAW).

Welding is a process that has become ubiquitous in various industries for a variety of applications. For example, welding is often used in applications such as shipbuilding, offshore platform, construction, pipe mills, and so forth. Certain welding techniques (e.g., Gas Metal Arc Welding (GMAW), Gas-shielded Flux Core Arc Welding (FCAW-G), and Gas Tungsten Arc Welding (GTAW)), typically employ a shielding gas (e.g., argon, carbon dioxide, or oxygen) to provide a particular local atmosphere in and around the welding arc and the weld pool during the welding process. In contrast, other welding techniques (e.g., submerged arc welding (SAW)) typically use a granular flux that decomposes or outgases under the arc conditions to provide the local atmosphere near the welding arc and weld pool. Additionally, SAW affords other advantages, such as increased deposition rates, compared to other welding techniques.

In general, for welding applications involving steel, one concern is the amount of diffusible hydrogen present in the weld during welding and after the welding process is complete. Hydrogen may be introduced into the weld from a number of sources, including moisture from the atmosphere, the metal surface, the welding electrode, or the flux. Hydrogen may also be introduced from oils, lubricants, or other coatings on the surface of the metal or welding wire during the welding operation. Hydrogen is readily soluble in steel exposed to high temperatures during the welding process; however, as the weld cools, the hydrogen may become increasingly insoluble in the steel and be rejected from solution. This may cause the hydrogen to collect at discontinuities and grain boundaries within the weld metal. These regions of high pressure and strain can cause the weld to become brittle and crack, which may eventually lead to weld failure.

One method of limiting diffusible hydrogen in the weld is by preheating the metal, for example, to limit the amount of moisture present on the surface of the metal during the welding operation and/or provide better control of the metal microstructure by regulating the rate at which the metal cools. Such a preheat method may be common for situations involving the welding of thicker steel plates or high strength steels. However, in certain situations, such as underwater welding applications, controlling the amount of moisture present during the welding process may be difficult or impossible. Additionally, fabricators can incur large costs (e.g., energy, equipment, time, etc) associated with preheating steel to reduce the possibility of hydrogen cracking. In other cases, preheats may be applied incorrectly and only a surface preheat is reached rather than a soaking preheat.

BRIEF DESCRIPTION

In an embodiment, a welding system includes a gas supply system configured to provide a fluorine-containing gas flow. The system also includes a wire supply system configured to provide welding wire, and a flux supply system configured to provide flux near a welding arc during submerged arc welding (SAW). The system further includes a welding torch assembly configured to receive the fluorine-containing gas flow and the welding wire and to deliver the fluorine-containing gas flow and the welding wire near the welding arc during the SAW.

In another embodiment, a method includes delivering a fluorine-containing gas flow via a plurality of passages that surround a submerged arc welding (SAW) arc such that a flux bed over a weld pool is substantially undisturbed.

In another embodiment, a system includes a welding torch having a welding torch body with a gas conduit configured to flow a fluorine-containing gas through the welding torch body. The welding torch further includes a contact tip having one or more gas conduits configured to flow the fluorine-containing gas around a welding arc. Furthermore, the contact tip is configured to couple to the welding torch body such that the gas conduit of the welding torch body is in fluid communication with the one or more gas conduits of the contact tip.

DRAWINGS

These and other features, aspects, and advantages of the present invention will become better understood when the following detailed description is read with reference to the accompanying drawings in which like characters represent like parts throughout the drawings, wherein:

FIG. 1 is a block diagram of a hybrid submerged arc welding (HSAW) welding system, in accordance with embodiments of the present disclosure;

FIG. 3 is a perspective view of a HSAW welding torch, in accordance with embodiments of the present disclosure;

FIG. 5 is an enlarged cross-sectional view of the contact tip illustrated in FIG. 4, in accordance with embodiments of the present disclosure;

FIG. 6 is a perspective view of the distal end of the contact tip, in accordance with embodiments of the present disclosure.

DETAILED DESCRIPTION

Figure 2:
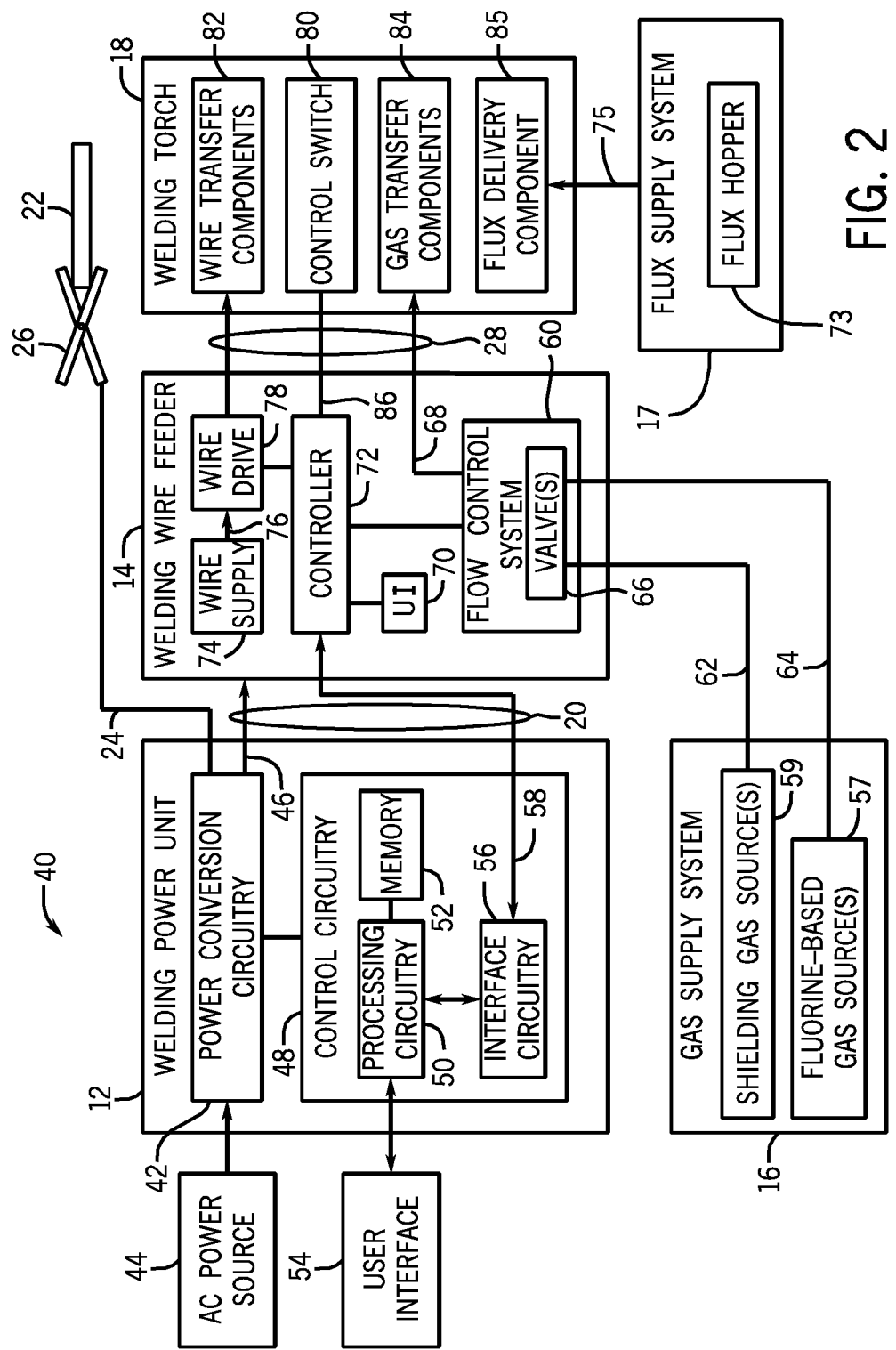
FIG. 2 is a block diagram demonstrating the internal circuitry of a HSAW welding system, in accordance with embodiments of the present disclosure.

As described in detail below, provided herein are embodiments of welding systems and methods utilizing a gas flow to control an atmosphere near (e.g., surrounding or proximate to) the arc and/or weld pool during submerged arc welding (SAW) or hybrid submerged arc welding (HSAW). Additionally, provided herein are embodiments of welding systems and methods specifically utilizing a fluorine-containing gas to reduce the amount of diffusible hydrogen in the weld metal during submerged arc welding (SAW) or hybrid submerged arc welding (HSAW). As such, the term "hybrid submerged arc welding" or "HSAW" may be generally used to refer to the disclosed systems that incorporate one or more gases (e.g., shielding gases, fluorine-containing gases, or any mixture thereof), similar to GMAW, but still generally submerge the weld in a flux bed. It should be appreciated that the disclosed embodiments are generally directed toward providing one or more gases (e.g., shielding gas, fluorine-containing gas, or any mixture thereof) to arc welding processes (e.g., SAW) that do not typically involve providing a gas flow. It should further be appreciated that, while the present discussion may focus specifically on SAW, the inclusion of a fluorine-containing gas as discussed herein may benefit any arc welding process that seeks to minimize diffusible hydrogen in welds.

A fluorine-containing gas, as used herein, is a single gas, or a mixture of gases, that substantially possess at least one fluorine atom per gas molecule. For example, the fluorine-containing gas may be a carbon-based gas, such as carbon tetrafluoride ($CF_4$), perfluoroethane ($C_2F_6$), or chlorotrifluoromethane ($CF_3Cl$), or may be an inorganic gas, such as nitrogen trifluoride ($NF_3$), boron trifluoride ($BF_3$), silicon tetrafluoride ($SiF_4$), fluorine ($F_2$), tungsten hexafluoride ($WF_6$), or any mixtures thereof. A shielding gas, as used herein, may refer to any gas or mixture of gases that may be provided to the arc and/or weld pool in order to provide a particular local atmosphere (e.g., shield the arc, improve arc stability, limit the formation of metal oxides, improve wetting of the metal surfaces, alter the chemistry of the weld deposit, and so forth). In certain embodiments, the shielding gas may be a single shielding gas or shielding gas mixture (e.g., argon (Ar), helium (He), carbon dioxide ($CO_2$), oxygen ($O_2$), nitrogen ($N_2$), similar suitable shielding gases, or any mixtures thereof). For example, a shielding gas flow may include Ar, $Ar/CO_2$ mixture, $Ar/CO_2/O_2$ mixtures, Ar/He mixtures, and so forth. Additionally, unless otherwise indicated, all references to gas mixture percentages are indicative of percent by volume.

In general, the disclosed HSAW embodiments incorporate a gas flow (e.g., a shielding gas flow and/or a fluorine-containing gas flow) that may, alone or in combination with the flux, provide a particular local atmosphere near the arc and/or weld pool. Accordingly, the disclosed HSAW embodiments enable greater freedom in the selection of the flux components since this gas flow may provide some or all of the local atmosphere during the welding process. Moreover, certain disclosed embodiments incorporate a fluorine-containing gas flow and, as such, may afford a method of effectively reducing the amount of diffusible hydrogen in a weld in a more cost effective manner than other solutions, such as the preheating method described above. However, it should be appreciated that the disclosed embodiments utilizing a fluorine-containing gas flow may be used in combination with a preheating method to provide a combined effect on the diffusible hydrogen content in the weld, and may also reduce the amount (or degree) of preheating typically used for a given welding operation. It should also be noted that the presently disclosed embodiments may employ a fluorine-containing gas rather than a fluorine-containing solid. Fluorine-containing gases offer advantages to the weld operator, such as greater flexibility in the selection of welding wire and reduced splatter during the welding operation.

Turning to the figures, FIG. 1 illustrates an embodiment of a hybrid submerged arc welding (HSAW) system 10 that utilizes a gas flow to provide at least a portion of the local atmosphere during the welding process, in accordance with embodiments of the present disclosure. The system 10 includes a welding power unit 12, a welding wire feeder 14, a gas supply system 16, a flux supply system 17, and a welding torch 18. The welding power unit 12 generally supplies power to the welding system 10 and may be coupled to the welding wire feeder 14 via cable bundle 20 as well as coupled to a workpiece 22 using a lead cable 24 having a clamp 26. In the illustrated embodiment, the welding wire feeder 14 is coupled to the welding torch 18 via a cable bundle 28 in order to supply welding wire (e.g., solid-core or flux-cored welding wire) and power to the welding torch 18 during operation of welding system 10. In another embodiment, the welding power unit 12 may couple and directly supply power to the welding torch 18.

In the depicted embodiment, the welding system 10 includes a gas supply system 16 that supplies a gas flow (e.g., shielding gas, fluorine-containing gas, or any mixture thereof) to the welding torch 18, in which the gas flow provides at least a portion of the local atmosphere at or near (e.g., approximately 0.5 mm, 1 mm, 2 mm, 3 mm, 4 mm, 5 mm, or less than approximately 30 mm) from the welding arc and/or weld pool. In the depicted embodiment, the gas supply system 16 is directly coupled to the welding torch 18 via a gas conduit 30. In another embodiment, the gas supply system 16 may instead be coupled to the wire feeder 14, and the wire feeder 14 may regulate the flow of gas from the gas supply system 16 to the welding torch 18. The flux supply system 17 of the illustrated HSAW system 10 provides flux to the welding torch 18 via a flux conduit 31. Accordingly, the illustrated welding torch 18 generally receives welding wire and power from the welding wire feeder 14, a flow of gas from the gas supply system 16, and a flow of flux from the flux supply system 17 in order to perform HSAW of the workpiece 22. During operation, the welding torch 18 may be brought near the workpiece 22 so that an arc 32 may be formed between the welding torch 18 and the workpiece 22. It should be appreciated that one aspect of the present disclosure is controlling the delivery of power, welding wire, gas, and flux to the torch 18, the arc 32, and/or the weld pool at the surface of the workpiece 22 to control the welding process.

The gas supply system 16 of the illustrated welding system 10 includes a gas source 34 in which the gas or gases (e.g., shielding gas, fluorine-containing gas, or any mixture thereof) may, for example, be stored together in a gas cylinder. For example, one or more shielding gases (e.g., Ar, He, $CO_2$, $O_2$, $N_2$, or any mixture thereof) may be stored in the gas source 34 to provide a shielding gas flow. Furthermore, one or more fluorine-containing gases may, additionally or alternatively, be stored in the gas source 34 to provide a fluorine-containing gas flow. Non-limiting examples of fluorine-containing gases may include any of: $C_mF_nX_p$, $NF_3$, $BF_3$, $SiF_4$, $F_2$, or $WF_6$, or any mixture thereof. For $C_mF_nX_p$, X may be a hydrogen or chlorine atom, m may be any value between 1 and 5, n may be any value between 1 and 18, and p may be any value between 0 and 18. For example, the fluorine-containing gas may be any of $CF_4$, $CF_3Cl$, $CF_2H_2$, $CFCl_3$, $C_2F_6$, $C_2F_4$, $C_2F_5Cl$, $C_2F_4H_2$, $C_3F_7H$, $C_4F_{10}$, etc., or any mixture thereof. For example, in certain embodiments, the gas supply system 16 may include a single gas cylinder containing approximately 95% $CF_4$ and approximately 5% $F_2$. As such, in certain embodiments, the concentration of fluorine-containing gas provided by the gas source 34 may be zero (i.e., substantially 0%) or between approximately 0.1% and 10% (e.g., 0.2%, 0.5%, 0.75%, 1%, 1.5%, 2%, 2.5%, 3%, 3.5%, 4%, 4.5%, 5%, 5.5%, 6%, 7%, 8%, 9%, 10%, etc.) fluorine-containing gas, with the remainder being a shielding gas or shielding gas mixture. In an embodiment, the percentage of fluorine-containing gas in the total gas flow supplied to the welding torch 18 is between approximately 0.5% and 5%. In an embodiment, the percentage of fluorine-containing gas in the total gas flow is less than approximately 0.1%, 1%, 2%, 3%, 4%, or 5%.

The flux supply system 17 may provide a flow of a granular flux via conduit 31 at or near (e.g., within 1 mm, 2 mm, 3 mm, 5 mm, or approximately less than 30 mm from) the arc 32. As the flow of flux is delivered near the arc 32, it may collect as a flux layer or bed near (e.g., over, covering, and/or proximate to) the weld pool. At least a portion of the flux may partially decompose and/or outgas (e.g., release one or more gases upon heating) at or near the arc 32 and/or weld pool and work in conjunction with the gas supply system 16 to provide a suitable local atmosphere at or near (e.g., within 1 mm, 2 mm, 3 mm, or approximately less than 30 mm from) the weld pool. The flux may, additionally or alternatively, promote the wetting of the workpiece 22, limit the formation of metal oxides, remove chemical impurities from the weld, and/or play similar roles to promote the welding process. The flux may generally include fluxes, such as typical agglomerated, bonded, or fused fluxes. These fluxes may be neutral, semi-neutral, or active fluxes and may have a range of different acidity or basicity levels. A non-limiting list of example fluxes include: aluminate rutile (AR), aluminate basic (AB), aluminate fluoride basic (AF), fluoride basic (FB) or calcium silicate (CS) fluxes. Additionally, in certain embodiments, the flux may be selected from a flux according to the EN 760 specification.

Furthermore, it is an aspect of the present disclosure that, in certain embodiments, the flux may be substantially mixed with the gas flow (e.g., a shielding gas and/or fluorine-containing gas flow) at or near (e.g., within 1 mm, 2 mm, 3 mm, or approximately less than 30 mm from) the arc 32 during the welding process. That is, as discussed in detail below with respect to FIGS. 3-6, certain embodiments of the HSAW system 10 may include a welding torch 18 that is configured to ensure that the gas flow (e.g., a shielding gas and/or fluorine-containing gas flow) generally displaces normal air dispersed within the granular flux before or as the flux reaches the arc 32. In other embodiments, the flux supply system 17 may, additionally or alternatively, store the flux under an atmosphere of the shielding gas and/or fluorine-containing gas such that the flux delivered to the welding torch 18 may be premixed with the gas flow (e.g., a shielding gas and/or fluorine-containing gas flow).

It should be generally appreciated that, in certain embodiments of HSAW system 10, the use of the gas flow (e.g., including shielding gases, fluorine-containing gases, or any mixture thereof) may generally allow for the use of different types of flux (e.g., those may not be compatible with typical SAW processes). That is, the gas flow (e.g., including shielding gases and/or fluorine-containing gases) may help to control the local atmosphere near (e.g., approximately 1 mm, 2 mm, 3 mm, or approximately less than 30 mm from) the arc 32, the weld pool, and/or the flux bed at the surface of the workpiece 22. As such, the quality of the weld may depend less on the local atmosphere provided by the flux. As such, lower cost flux may be utilized with the present HSAW system 10. Furthermore, by using the fluorine-containing gas flow, other components typically used in the flux or electrode (e.g., flux-cored, metal-cored, or solid wire), such as fluoride salts or other solid fluorine sources, may be reduced or eliminated altogether. This may generally enable more freedom to select a flux and/or wire electrode based on other considerations (e.g., related to the cost of the flux and/or wire, desired weld properties, desired weld chemistry, slag removal, bead shape, penetration, deposition rates, and so forth). For example, in embodiments utilizing a fluorine-containing gas flow, acidic fluxes generally selected to reduce the resulting hydrogen content in the weld may be supplanted by more basic fluxes, while still providing welds having similar hydrogen content.

As mentioned, the illustrated HSAW system 10 controls the welding process by controlling the delivery of power, welding wire, gas, and flux to the torch 18, the arc 32, and/or the weld pool at the surface of the workpiece 22. Additionally, in certain embodiments, by controlling the chemistry of the shielding gas and/or fluorine-containing gas, the chemistry of the arc 32 and/or the resulting weld may be tuned. For example, when welding metals that are especially sensitive to the presence of diffusible hydrogen, the gas supply system 16 may supply a higher flow rate of a fluorine-containing gas or utilize a higher relative concentration fluorine-containing gas (e.g., between 5% and 10% fluorine-containing gas in shielding gas) to maximize diffusible hydrogen scavenging. For example, when using a carbon-based, fluorine-containing gas, utilizing gases with a higher number of carbons (i.e., larger m values) may contribute a greater amount of carbon to the resulting weld, which may be desirable for certain steel applications, while still reducing the amount of diffusible hydrogen. By further example, when using carbon-based fluorine-containing gases, using gases having some hydrogen (i.e., X is a hydrogen atom and p is greater than 0) may provide benefits to the arc, such as increasing arc temperature and arc penetration into the workpiece, while still limiting the amount of hydrogen that may be contributed to the weld metal during the welding operation. However, not all fluorine-containing gases are compatible with applications involving particular metals. For example, while sulfur hexafluoride ($SF_6$) may be used as an additive to the shield gas to reduce the amount of diffusible hydrogen present in a weld, some materials (e.g., steel) are not compatible with $SF_6$ since the amount of sulfur (e.g., iron sulfide) remaining in the weld after the welding process may cause cracking due to sulfur segregation during weld solidification. As such, the fluorine-containing gases utilized by certain presently disclosed embodiments are substantially free of sulfur.

For some implementations, it may be desirable for the gas supply system 16 to deliver a fluorine-containing gas flow (e.g., including $CF_4$, $F_2$, $CF_2Cl_2$, or similar fluorine containing gas or gas mixture) and a shielding gas flow (e.g., Ar, He, $CO_2$, $O_2$, $N_2$, or any mixture thereof) from separate gas sources. Turning to FIG. 2, a block diagram of another embodiment of a HSAW system 40 is presented. More specifically, FIG. 2 illustrates some of the internal components of a welding system 40 that may employ a fluorine-containing gas flow to reduce the diffusible hydrogen in welds, in accordance with certain embodiment of the present disclosure. Furthermore, similar to the HSAW system 10 of FIG. 1, the HSAW system 40 illustrated in FIG. 2 generally includes a welding power unit 12, a welding wire feeder 14, a welding torch 18, a gas supply system 16, and a flux supply system 17.

In the embodiment illustrated in FIG. 2, the welding power unit 12 includes power conversion circuitry 42 that receives input power from an alternating current power source 44 (e.g., the AC power grid, an engine/generator set, or a combination thereof), conditions the input power, and provides output power via cable 46 to power the welding wire feeder 14 that, in turn, powers the welding torch 18, in accordance with demands of the system 40. Accordingly, in some embodiments, the power conversion circuitry 42 may include circuit elements (e.g., transformers, rectifiers, switches, and so forth) capable of converting the AC input power to a direct current electrode positive (DCEP) output, direct current electrode negative (DCEN) output, or a variable balance AC output, as dictated by the demands of the system 40. The lead cable 24 terminating in the clamp 26 couples the power conversion circuitry 42 to the workpiece 22 and closes the circuit between the welding power unit 12, the workpiece 22, and the welding torch 18.

The weld power unit 12 also includes control circuitry 48 that is configured to receive and process a plurality of inputs regarding the performance and demands of the welding system 40. The control circuitry 48 includes processing circuitry 50 and memory 52. The memory 52 may include volatile or non-volatile memory, such as ROM, RAM, magnetic storage memory, optical storage memory, or a combination thereof. Furthermore, a variety of control parameters may be stored in the memory 52 along with code configured to provide a specific output (e.g., initiate wire feed, enable gas flow, enable flux flow, etc.) during operation. The processing circuitry 50 may also receive one or more inputs from a user interface 54, through which the user may choose a process and input desired parameters (e.g., voltages, currents, particular pulsed or non-pulsed welding regimes, and so forth). For example, in certain embodiments, the user interface 54 may enable the user to set parameters regarding the magnitude and amplitude of the electrode positive (EP) or electrode negative (EN) current (e.g., for welding application involving variable balance AC current).

Based on such inputs received from the operator, the control circuitry 48 operates to control generation of welding power output that is applied to the welding wire for carrying out the desired welding operation, for example, via control signals transmitted to the power conversion circuitry 42. Based on such control commands, the power conversion circuitry 42 is adapted to create the output power that will ultimately be applied to the welding wire at the welding torch 18. To this end, as noted above, various power conversion circuits may be employed, including choppers, boost circuitry, buck circuitry, inverters, converters, and so forth. Still further, in the embodiment of FIG. 2, the control circuitry 48 also includes interface circuitry 56 configured to interface with the electronics of the welding wire feeder 14 during operation. The interface circuitry 56 is coupled to the processing circuitry 50 as well as to components of the welding wire feeder 14. Further, the processing circuitry 50 provides control signals associated with the weld operation to the welding wire feeder 14 via a cable 58 coupled to the interface circuitry 56. As before, the welding power unit 12 and the welding wire feeder 14 may be coupled to one another via the bundle 20 of cables, and the welding torch 18 may be coupled to the welding wire feeder 14 via the cable bundle 28.

In the illustrated embodiment, the gas supply system 16 includes one or more fluorine-containing gas sources 57 and one or more shielding gas sources 59. That is, the illustrated gas supply system 16 is configured to supply a fluorine-containing gas flow (e.g., including $CF_4$, $F_2$, $CF_2Cl_2$, similar fluorine containing gas, or any mixture thereof) and a shielding gas flow (e.g., including Ar, He, $CO_2$, $O_2$, $N_2$, or any mixture thereof) to a flow control system 60 located in the welding wire feeder 14. In other embodiments, the shielding gas sources(s) 59 may not be used and the flux supplied by the flux supply system 17 may substantially provide a shielding atmosphere over the weld pool while the fluorine-containing gas scavenges the residual hydrogen from the weld pool. In the depicted embodiment, the gas supply system 16 individually delivers the gases to the flow control system 60 via one or more shielding gas conduits 62 (e.g., conduit bundle) and one or more of fluorine-containing gas conduits 64 (e.g., conduit bundle). In another embodiment, the gas supply system 16 may be coupled to a single premixed gas source (e.g., 2% $CF_4$ in 98% $Ar/CO_2$ 1:1) that may couple to the flow control system 60 via a single gas conduit, similar to the embodiment of FIG. 1.

In the HSAW system 40 of FIG. 2, the flow control system 60 may be coupled to multiple fluorine-containing gas sources 57 as well as multiple shielding gas sources 59. For example, the flow control system 60 may receive individual gas flows from two shielding gas sources 59 (e.g., Ar and $CO_2$) via different conduits in the shielding gas conduit bundle 62, and receive three fluorine-containing gas sources (e.g., $CF_4$, $CF_3Cl$, and $F_2$) via different conduits in the fluorine-containing gas conduit bundle 64, and provide a mixed gas flow from five separate gas sources. It should be appreciated that certain embodiments may employ any number of gas conduits and gas sources. In another embodiment, the flow control system 60 may receive and regulate a gas flow from one or more shielding gas sources 59 and one or more fluorine-gas sources 57 and, rather than mix the gases together, output the gases individually (i.e., via different conduits) to the welding torch 18. Additionally, the flow control system 60 includes a plurality of valves 66, and may contain a plurality of regulators, gas flow sensors, and so forth, which regulate the flow of the incoming gas flows as well as the outgoing gas flow, which traverses gas conduit 68 to reach the welding torch 18.

The shielding gas source(s) 59 may contain any of Ar, He, $CO_2$, $O_2$, $N_2$, or any mixture thereof. For example, the shielding gas source 59 may contain 100% $CO_2$, an approximately 85% Ar/15% $CO_2$ mixture, an approximately 75% Ar/24% $CO_2$/1% $O_2$ mixture, an approximately 95% $CO_2$/5% $N_2$ mixture, 100% $CO_2$, etc. The fluorine-containing gas source(s) 57 may contain any of $C_mF_nX_p$, $NF_3$, $BF_3$, $SiF_4$, $F_2$, or $WF_6$, or any mixture thereof. For $C_mF_nX_p$, X may be a hydrogen or chlorine atom, m may be any value between 1 and 5, n may be any value between 1 and 18, and p may be any value between 0 and 18. For example, the fluorine-containing gas may be any of $CF_4$, $CF_2Cl_2$, $CF_3Cl$, $CF_3H$, $C_2F_4H_2$, $C_2FCl_3$, $C_2F_4H_2$, $C_2F_6$, $C_3F_6Cl_2$, $C_4F_7H_3$, etc., or any mixture thereof. Or, for example, the fluorine-containing gas may contain an approximately 98% $CF_4$/2% $CF_2Cl_2$ mixture, an approximately 90% $CF_3H$/10% $BF_3$ mixture, an approximately 85% $C_2F_4$/13% $CF_4$/2% $WF_6$ mixture, etc. In an embodiment, the percentage of fluorine-containing gas in the total gas flow supplied to the welding torch 18 by the flow control system 60 is between approximately 0.01% and 10%. In an embodiment, the percentage of fluorine-containing gas in the total gas flow is less than approximately 0.1%, 1%, 2%, 3%, 4%, or 5%.

As illustrated in FIG. 2, in addition to the flow control system 60, the welding wire feeder 14 also includes a user interface 70 that allows for system parameters (e.g., wire feed speeds, processes, selected currents, voltages or power levels, relative shielding/fluorine-containing gas concentrations and flow rates, flux flow rates, and so forth) to be set on the welding wire feeder 14. As such, the user interface 70 is coupled to a controller 72, which allows for wire feed speeds to be controlled in accordance with operator selections, and permits these settings to be fed back to the power supply unit 12 via the interface circuitry 56. The controller 72 also controls the flow control system 60 based on user defined settings and adjusts the relative ratios and flow rates of each of the individual gases to produce the desired mixed gas flow to be delivered to the welding torch 18 via the gas conduit 68. As mentioned above, in an embodiment, the flow control system 60 may deliver the fluorine-containing gas and the shielding gas separately to the welding torch 18 via a plurality of gas conduits 68. Furthermore, in certain embodiments, the controller 72 may couple to the flux supply system 17 such that the operation of the flux supply system 17 (e.g., a flux hopper 73) may be controlled via user settings entered from user interface 70.

The welding wire feeder 14 also includes components for feeding wire to the welding torch 18 and thereby to the welding application, under the control of the controller 72. For example, one or more wire supplies 74 (e.g., spools) of welding wire 76 are housed in the welding wire feeder 14. A wire feeder drive unit 78 may unspool welding wire 76 from the spools 74 and to progressively feed the welding wire 76 to the welding torch 18. To that end, the wire feeder drive unit 78 may include components such as circuitry, motors, rollers, and so forth, configured in a suitable way for establishing an appropriate wire feed. For example, in one embodiment, the wire feeder drive unit 78 may include a feed motor that engages with feed rollers to push wire from the welding wire feeder 14 towards the welding torch 18. Power from the welding power unit 12 is applied to the fed wire, typically by the cable 46.

The illustrated HSAW system 40 includes the flux supply system 17 having a flux hopper 73. The flux supply system 17 may generally provide a flow of granular flux to the welding torch 18 via a conduit 75. As discussed in detail below, in certain embodiments, the welding torch 18 may include a contact tip that is configured to displace any air in the granular flux with the shielding gas flow, the fluorine-containing gas flow, or any mixture thereof, provided by the flow control system 60. In other embodiments, the flux supply system 17 may be coupled to the gas supply system 16 such that the flux stored in the flux supply system (e.g., in the flux hopper 73) may be maintained under an atmosphere including a fluorine-containing gas, a shielding gas, or a fluorine-containing gas/shielding gas mixture, prior to being provided to the welding torch 18 via the conduit 75. Furthermore, as mentioned, in certain embodiments, the flux supply system 17 may be controlled by the controller 72 such that the user may control the rate at which flux is delivered to the welding torch 18 and/or the workpiece 22.

In the illustrated embodiment, the welding torch 18 may include a control switch 80, wire transfer components 82, gas transfer components 84, and a flux delivery component 85. Other aspects of certain embodiments of the welding torch 18 are discussed in detail below, with respect to FIGS. 3-6. In general, during welding system operation, the welding wire may be advanced through the cable bundle 28 towards the welding torch 18. Within the welding torch 18, additional wire transfer components 82, such as an additional pull motor and an associated drive roller, may be provided. The pull motor may be regulated to provide the desired wire feed speed. Additionally, gas transfer components 84 (e.g., nozzles, control valves, gas diffusers, etc.) may be included in the welding torch 18 to control and direct the flow of the gas mixture (e.g., shielding gas, fluorine-containing gas, or any mixtures thereof) being received via the gas conduit 68. The welding torch 18 may also include a control switch 80, coupled to the controller 72 in the welding wire feeder 14 via a control line 86, which may provide a signal the controller 72 to allow the welding process to be started and stopped by the operator. These start/stop signals may be propagated from the controller 72 to the flow control system 60 and the welding power unit 12. Accordingly, activating the control switch 80 may cause the gas flow to begin, flux to be provided, the wire to advance, and power to be applied to the advancing welding wire.

In another embodiment, the welding torch 18 may also include one or more sensors coupled to the controller 72 of the welding wire feeder 14. During operation, the sensors may be configured to measure one or more parameters from the welding torch 18 that are indicative the weld environment. To that end, the one or more sensors (e.g., thermal sensors, gas flow rate sensors, chemical sensors, optical sensors, etc.) may measure desired parameters continuously or at desired intervals throughout the weld operation. As the sensors acquire this data, it may be communicated to the controller 72 in the welding wire feeder 14 such that parameters of the welding system 40 (e.g., fluorine-containing gas concentrations and flow rates, wire feed rates, flux flow rates, arc voltage and current, etc.) may be adjusted by the controller 72 during system operation.

It should be appreciated that it may generally be desirable for the fluorine-containing gas flow (e.g., the flow of shielding gas, fluorine-containing gas, or any mixtures thereof) from the contact tip of the welding torch 18 to be regulated such that the bed of flux supplied by the flux supply system 17 is not disturbed on the surface of the workpiece 22 (e.g., moved on or removed from the surface of the workpiece 22) during the welding process. However, it should also be appreciated that, in certain embodiments, it may be desirable for the gas flow provided to the welding torch 18 to be thoroughly mixed with the granular flux supplied by the flux supply system 17. Accordingly, a modified welding torch 18 is discussed below (with respect to FIGS. 3-6) that may generally provide these desirable features. That is, the modified torch embodiment described below provides a modified contact tip that enables the delivery of gas (e.g., shielding gas, fluorine-containing gas, or any mixtures thereof) through a number of conduits surrounding the welding wire 76 as it is delivered to the welding arc 32. By delivering the gas flow via conduits as presently disclosed, relatively low pressures and flow rates may be used. This generally prevents the flux bed from being disturbed, while the gas flow (e.g., shielding gas flow, fluorine-containing gas flow, or any mixtures thereof) may still be sufficient to provide the desired effect or effects (e.g., scavenging residual hydrogen, controlling the chemistry of the weld, stabilizing the arc, controlling the surface chemistry of the workpiece, etc.). Furthermore, the welding torch embodiment discussed below enables the thorough mixing of the granular flux and the gas flow at the contact tip of the welding torch prior to reaching the arc and/or weld pool. It should be appreciated that while the welding torch discussed with respect to FIGS. 3-6 is a specific embodiment of welding torch for HSAW welding, other welding torch embodiments delivering the gas flow at or near the welding arc and/or weld pool (e.g., welding torches having a single gas conduit disposed internally or externally relative to the welding torch body) are also considered.

With the foregoing in mind, FIG. 3 is a perspective view of an embodiment of a hybrid submerged arc welding (HSAW) torch 18 that is configured to provide a gas flow, welding wire, and flux to the surface of the workpiece 22. The illustrated HSAW torch 18 includes a body 90 that encapsulates a number of passages (discussed in detail below) through which the welding wire and the gas (e.g., shielding gas, fluorine-containing gas, or any mixtures thereof) may traverse before exiting near a distal end 92 of the welding torch 18. That is, the welding wire 76 and the gas flow 68 being separately provided by the welding wire feeder 14 to the welding torch 18 may generally enter the torch from one end (e.g., proximal) portion 93 and may generally exit near a contact tip at the distal end 92 of the torch 18. Additionally, for the torch embodiment illustrated in FIG. 3, a flux delivery component 85 has been attached to the body 90 of the torch 18 via a clamping mechanism 94 such that the flux delivery component 85 surrounds the contact tip near the distal and 92 of the welding torch 18. In other embodiments, the flux delivery component 85 may be a conduit that affixes to the body 90 of the welding torch 18 that deposits flux near the weld arc without surrounding the contact tip. Furthermore, the illustrated flux delivery component 85 includes a conduit 96 that may couple to the conduit 75 in order to receive flux from the flux supply system 17. In general, the illustrated flux delivery component 85 enables the delivery of flux around the contact tip such that the gas emanating from the contact tip of the welding torch 18 may thoroughly mix with the flux, and such that a substantial amount of the air contained in the granular flux may be displaced by the gas (e.g., shielding gas, fluorine-containing gas, or any mixtures thereof). Furthermore, it should be appreciated that since the illustrated flux delivery component 85 encircles the contact tip, generally lower gas pressures and/or gas flow rates may be used to displace this air, which may be generally desirable in order to limit the disturbance of the flux bed by the gas flow.

In certain embodiments, by adding a fluorine-containing gas flow at or near a weld pool during submerged arc welding, lower hydrogen levels as well as improved mechanical properties may be realized. That is, the addition of the fluorine containing gas flow to the SAW process provides better control over weld chemistry than may be achieved using a shielding gas or a granular flux alone. Furthermore, in certain embodiments, it may generally be desirable to deliver a sufficiently high flow of fluorine-containing gas as close as possible to the arc 32 to ensure that the gas is able to reach the arc plasma stream without substantially disturbing the flux bed. As such, the illustrated HSAW welding torch 18 generally provides an improved system that allows delivery of the gas (e.g., shielding gas, fluorine-containing gas, or any mixtures thereof), wire and flux immediately at the arc 32 for results that provide the desired amount of mixture of all constituents at or near the arc 32.

Figure 4:
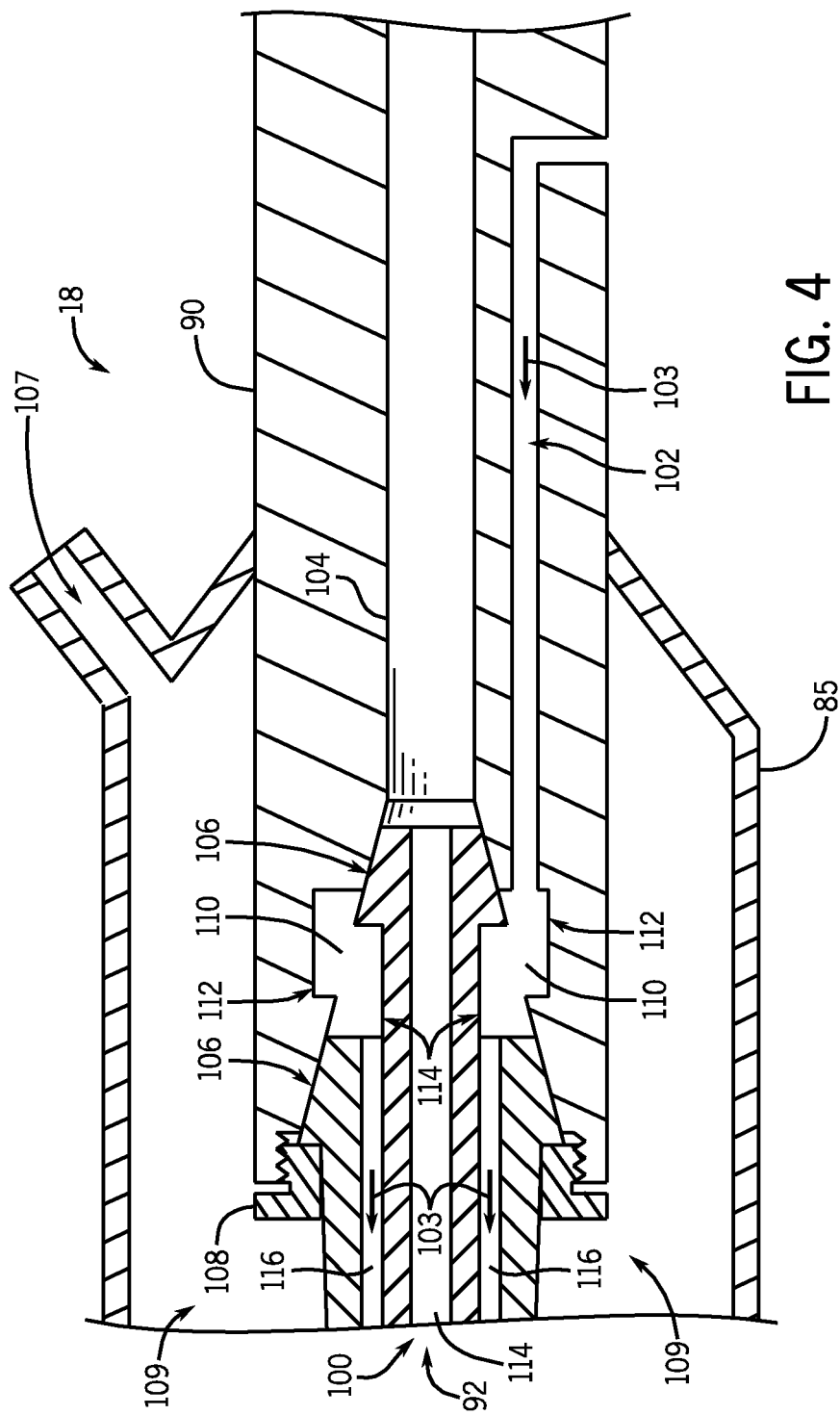
FIG. 4 is a cross-sectional view of the welding torch illustrated in FIG. 3 taken within line 4-4, in accordance with embodiments of the present disclosure.

FIG. 4 is a cross-sectional view of the welding torch 18 illustrated in FIG. 3 taken within line 4-4. In particular, FIG. 4 illustrates a contact tip 100 loaded into a portion of the torch body 90 and encompassed by the flux delivery component 85. The torch body 90 includes a passage 102 (e.g., a longitudinal passage) that may couple to the conduit 68 (e.g., from the flow control system 60 of the welding wire feeder 14) and may provide a path for the gas flow 103 (e.g., shielding gas flow, fluorine-containing gas flow, or any mixtures thereof) through the body 90 of the torch 18. Furthermore, the torch body 90 includes another passage 104 that may provide a conduit for delivering the welding wire 76 (e.g., provided from the welding wire feeder 14) to the contact tip 100 at the distal end 92 of the welding torch 18. The illustrated welding torch body 90 embodiment further includes a generally conical cavity 106 (e.g., a mating cavity) within which the contact tip 100 is adapted to securely fit. The flux delivery component 85 may generally provide a flow 107 of flux into a cavity 109 between the flux delivery component 85 and the welding torch body 90 and/or contact tip 100 such that the gas flow 103 exiting from the contact tip 100 may be thoroughly mixed with delivered flow of flux 107 (e.g., to displace any air) before reaching the weld pool.

The illustrated contact tip 100, when inserted into the welding torch body 90, may provide a tight, sealed connection such that the flow of gases (e.g., shielding gas flow, fluorine-containing gas flow, or any mixtures thereof) is easily facilitated from the welding torch body 90 into and through the contact tip 100. The illustrated contact tip 100 is retained within the welding torch body 90 by conventional means (e.g., a threaded ring or nut 108, a locking pin, a retaining ring, or similar mechanism), which may forcefully engage and hold the contact tip 100 in an operative position. Generally speaking, the precise mating cavity for the contact tip 100 helps to assure a positive gas flow in the direction of the arc 32 (i.e., the distal end 92 of the torch 18) and not back toward the welding torch body 90. When the contact tip 100 is placed in the conical cavity 106 of the welding torch body 90, a chamber 110 is formed between the machined groove 112 of the welding torch body 90 and the machined groove 114 of the contact tip 100 as they are brought into alignment, as shown. Additionally, the illustrated chamber 110 couples to the passage 102 which carries the gas through the welding torch body 90 (i.e., all three are in fluid communication). This chamber 110 generally receives the gas from passage 102 before introducing the gas flow to the contact tip 100. Due to the closely fitted mating surfaces of the contact tip 100 and the conical cavity 106, the chamber 110 and the passage 102 are isolated from each other to prevent the escape of the gas (e.g., shielding gas, fluorine-containing gas, or any mixtures thereof) via the passage 102.

The contact tip 100 has a central passage 114 for the welding wire to pass through as well as provide electrical contact to form the arc 32 with the workpiece 22. The contact tip 100 further includes a number of passages 116 (e.g., disposed about the central passage 114) that carry the gas (e.g., shielding gas, fluorine-containing gas, or any mixtures thereof) to the distal end 92 of the contact tip 100. In certain embodiments, these passages 116 may be radially or coaxially oriented about the central passage 114. Furthermore, there may be any suitable number of passages 116 to provide a path for the gas from the chamber 110 to the distal end 92 of the welding torch 18. For example, certain torch embodiments may include 1, 2, 3, 4, 5, 6, 8, 10, or 12 passages 116 disposed about the central passage 114 in order to effectively disperse the gas (e.g., shielding gas, fluorine-containing gas, or any mixtures thereof) into the weld arc and flux.

FIG. 5 illustrates a cross-section of the contact tip 100 that is removed from the welding torch body 90. Accordingly, the mating portion of the contact tip 100 includes a generally conical shaped portion 118 with the machined groove 112 that generally matches in shape to provide a secure fit when loaded into the body 90 of the welding torch 18. The contact tip 100 includes the central passage 114 for providing the wire and power to the arc 32, while the surrounding passages 116 deliver a flow of gas (e.g., shielding gas, fluorine-containing gas, or any mixtures thereof) from the chamber 110 to the arc 32 as well as to the flow of flux 107 provided by the flux delivery component 85 that is disposed near (e.g., proximate to, around, or encircling) the contact tip 100. Additionally, FIG. 6 illustrates a perspective view of the distal end 92 of an embodiment of the contact tip 100. The illustrated contact tip embodiment includes the central passage 114 for providing the wire and power to the arc 32 while the surrounding passages 116 provide a flow of gas (e.g., shielding gas, fluorine-containing gas, or any mixtures thereof) to the arc 32 and/or flux provided by the flux delivery component 85. Furthermore, the illustrated contact of 100 includes six gas delivery passages 116 encircling the central passage 114; however, it should be appreciated that any number of passages 116 may be used to deliver the gas flow. Additionally, it should be appreciated that while the illustrated passages 116 form circular orifices that are symmetrically distributed about a central passage 114, any number of passage shapes or arrangements that provide the flow of gas near the arc 32 and/or flux (e.g., elliptical passages, one or more passages coaxial with the central passage 114, non-symmetrical arrangements, and the like) are also presently contemplated.

Figure 7:
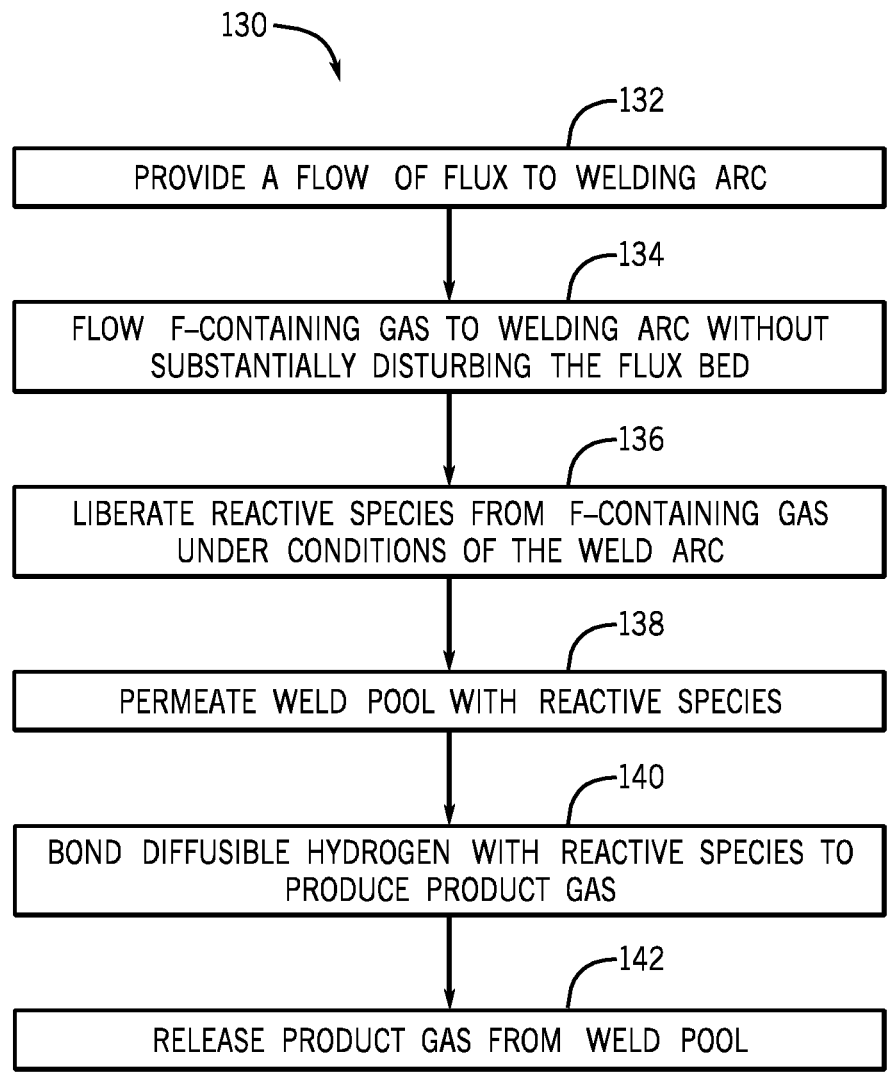
FIG. 7 is a flow diagram illustrating the steps that are believed to be involved in the removal of diffusible hydrogen from the weld metal using a fluorine-containing gas during SAW, in accordance with embodiments of the present disclosure.

For certain embodiments, once the flux, wire, and fluorine-containing gas have been delivered to the contact tip 100 of the welding torch 18, a series of events, depicted in the block flow diagram of FIG. 7, are believed to take place to remove the diffusible hydrogen from the weld. The first step of the process 130 is the introduction (block 132) of a flow of flux and a flow of fluorine-containing gas (block 134) at or near the arc 32 and/or weld pool at the contact tip 100 of the welding torch 18. It should be appreciated that the flow rates for both the fluorine-containing gas flow and the flux flow may be controlled such that the fluorine-containing gas may generally displace any residual air that may be present in the granular flux while still producing a substantially undisturbed flux bed (e.g., the bed of granular flux generally remains covering the weld pool despite the fluorine-containing gas flow and is not significantly removed). It should also be appreciated that, for HSAW embodiments that utilize a shielding gas flow alone (i.e., no fluorine-containing gas), the welding process may generally incorporate similar steps of providing a flow of flux near the welding arc, and thoroughly mixing the shielding gas with the granular flux to displace any residual air without substantially disturbing the flux bed disposed over the weld pool.

Next, the conditions in and around the arc 32, namely the high voltage and high temperature environment, may then begin to break the chemical bonds in the fluorine-containing gas and liberate (block 136) a reactive species from the fluorine-containing gas molecules. As used herein, the reactive species may be any residual radical (i.e., F., $CF_3$., Cl.) or ion (i.e., $CF_3^+$, $F^-$, $Cl^-$, etc.) produced from the fluorine-containing gas decomposition, or any combination thereof. Then, the liberated reactive species may permeate (block 138) the molten metal of the weld pool. In an embodiment, a portion of the fluorine-containing gas may enter the weld pool before the reactive species are liberated. Regardless of when it is liberated, the liberated reactive species in the weld pool bonds (block 140) with diffusible hydrogen that is dissolved in the weld pool, reacting with it to form a product gas (e.g., HF, HCl, $CF_3H$, etc.). Since the product gas may be less soluble in the molten metal than hydrogen, it may be released (block 142) from the molten weld pool before or as the weld is cooled, resulting in a weld having reduced diffusible hydrogen content. It should be noted that the liberated reactive species may also react with hydrogen present in the arc before reaching the weld pool, and thereby may also reduce the amount of hydrogen in the weld pool in a preventative manner.

It should be appreciated that the role of the fluorine atoms in the fluorine-based gas in the embodiment presented in FIG. 7 may be two-fold. First, the decomposition of the fluorine-based gas produces reactive species, such as $F^-$ and F., that may be well-suited for reacting with diffusible hydrogen in the deposition or making of the weld metal. However, the second, more subtle role of the fluorine atoms in the fluorine-based gas molecular structure is the electronic stabilization of other reactive species, such as $CF_3^+$, that may also be able to react with diffusible hydrogen in the weld.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding system, comprising:
 a gas supply system configured to provide a fluorine-containing gas flow;
 a wire supply system configured to provide welding wire;
 a flux supply system configured to provide flux near a welding arc during submerged arc welding (SAW); and
 a welding torch assembly configured to receive the fluorine-containing gas flow and the welding wire and to deliver the fluorine-containing gas flow and the welding wire near a welding arc during submerged arc welding (SAW).

2. The welding system of claim 1, wherein the fluorine-containing gas flow and the flux both at least partially provide a local atmosphere near the arc.

3. The welding system of claim 1, wherein the welding torch assembly is configured to mix the flux and the fluorine-containing gas flow near the welding arc.

4. The welding system of claim 1, wherein the fluorine-containing gas flow comprises argon, helium, carbon dioxide, oxygen, nitrogen, hydrogen or a combination thereof.

5. The welding system of claim 1, wherein the fluorine-containing gas flow is nitrogen-based fluorine-containing gas flow, silicon-based fluorine-containing gas flow, tungsten-based fluorine-containing gas flow, or a combination thereof.

6. The welding system of claim 1, comprising a welding power supply configured to provide a DC electrode positive (DCEP) output, DC electrode negative (DCEN) output, or a variable balance AC output to the welding torch assembly.

7. The welding system of claim 1, wherein the flux comprises aluminate rutile (AR), aluminate basic (AB), aluminate fluoride basic (AF), fluoride basic (FB), or calcium silicate (CS) flux.

8. The welding system of claim 5, wherein the fluorine-containing gas flow comprises carbon tetrafluoride.

9. The welding system of claim 8, wherein the fluorine-containing gas flow comprises between approximately 0.01% and approximately 10% by volume fluorine-containing gas.

10. A system, comprising:
 a welding torch assembly, comprising:
  a welding torch body comprising a gas conduit configured to flow a fluorine-containing gas through the welding torch body; and
  a contact tip comprising a plurality of gas conduits configured to flow the fluorine-containing gas around a welding arc, wherein the contact tip is configured to couple to the welding torch body such that the gas conduit of the welding torch body is in fluid communication with the plurality of gas conduits of the contact tip.

11. The system of claim 10, wherein the contact tip comprises a central wire conduit configured to provide a supply of welding wire to the welding arc, and wherein the plurality of gas conduits are disposed in a ring around the central wire conduit.

12. The system of claim 10, comprising a flux delivery component configured to deliver granular flux near the welding arc, wherein the flux delivery component is coupled to the welding torch body near the contact tip and configured to mix the granular flux with the fluorine-containing gas near the welding arc.

13. The system of claim 10, wherein the welding torch assembly is a submerged arc welding torch, hybrid submerged arc welding torch, or a gas metal arc welding torch.

14. The system of claim 12, wherein the granular flux is configured to form a flux bed near a weld pool, and wherein the contact tip is configured to prevent the fluorine-containing gas flow from displacing the granular flux of the flux bed.

* * * * *